US010449654B2

(12) United States Patent
Campolo et al.

(10) Patent No.: US 10,449,654 B2
(45) Date of Patent: Oct. 22, 2019

(54) INSTRUMENTED TOOLS FOR MONITORING INTERACTION DYNAMICS DURING CONTACT TASK

(71) Applicant: NANYANG TECHNOLOGICAL UNIVERSITY, Singapore (SG)

(72) Inventors: Domenico Campolo, Singapore (SG); Gia-Hoang Phan, Singapore (SG); Asif Hussain, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 15/756,423

(22) PCT Filed: Sep. 1, 2016

(86) PCT No.: PCT/SG2016/050426
§ 371 (c)(1),
(2) Date: Feb. 28, 2018

(87) PCT Pub. No.: WO2017/039544
PCT Pub. Date: Mar. 9, 2017

(65) Prior Publication Data
US 2018/0243881 A1 Aug. 30, 2018

(30) Foreign Application Priority Data
Sep. 1, 2015 (SG) .......................... 10201506913S

(51) Int. Cl.
*G01L 5/10* (2006.01)
*B24B 49/16* (2006.01)
(Continued)

(52) U.S. Cl.
CPC ............ *B24B 49/16* (2013.01); *B24B 27/027* (2013.01); *G01L 1/005* (2013.01); *G01L 3/04* (2013.01)

(58) Field of Classification Search
CPC ......... B24B 49/16; B24B 49/00; B24B 49/02; B24B 27/027; B24B 1/00; B24B 23/02; G01L 1/005; G01L 3/04
See application file for complete search history.

(56) References Cited

U.S. PATENT DOCUMENTS 4,420,908 A * 12/1983 Reiling .................... B24D 7/16
15/180
5,509,847 A * 4/1996 Jinno ...................... B24B 27/04
451/11
(Continued)

FOREIGN PATENT DOCUMENTS

| CN | 2085282 | * | 9/1991 |
| CN | 2085282 U | | 9/1991 |

(Continued)

OTHER PUBLICATIONS

J. N. Pires, A. Loureiro, T. Godinho, P. Ferreira, B. Fernando, and J. Morgado, "Welding robots," Robotics and Automation Magazine, IEEE, vol. 10, No. 2, pp. 45-55, 2003.
(Continued)

*Primary Examiner* — Harshad R Patel
*Assistant Examiner* — Nigel H Plumb

(57) ABSTRACT

An instrumented tool for surface finishing of a work-piece, the instrumented tool comprising: a tool configured to be spun and brought into contact with the work-piece while spinning; a spindle configured to provide a spinning torque to spin the tool; a flexible coupler provided between the spindle and the tool to transmit only spinning torque of the spindle to the tool; a rigid connection provided between the spindle and the tool in parallel to the flexible coupler; and a multi-axis force/torque/strain/pressure sensor attached to at least the rigid connection; wherein the rigid connection and the multi-axis force/torque sensor are decoupled from spinning of the spindle and the tool, and wherein the multi-axis
(Continued)

force/torque sensor is configured to measure at least one of: contact force and torque between the tool and the workpiece.

13 Claims, 6 Drawing Sheets

(51) Int. Cl.
*B24B 27/027* (2006.01)
*G01L 1/00* (2006.01)
*G01L 3/04* (2006.01)

(56) References Cited

U.S. PATENT DOCUMENTS

| | | | |
|---|---|---|---|
| 8,550,876 B2* | 10/2013 | Demers | B24B 49/16 451/10 |
| 8,747,188 B2* | 6/2014 | Maloney | B24B 27/0038 451/5 |
| 2003/0003847 A1* | 1/2003 | Yi | B24B 37/005 451/9 |
| 2014/0235141 A1 | 8/2014 | Maloney et al. | |

FOREIGN PATENT DOCUMENTS

| | | | |
|---|---|---|---|
| CN | 103009218 | * | 4/2013 |
| CN | 105643399 | | 6/2016 |
| WO | 9700155 A1 | | 1/1997 |

OTHER PUBLICATIONS

T. Sugar and V. Kumar, "Control and coordination of multiple mobile robots in manipulation and material handling tasks," in Experimental Robotics VI, pp. 15-24, Springer, 2000.
A. Gasparetto, R. Vidoni, D. Pillan, and E. Saccavini, "Automatic path and trajectory planning for robotic spray painting," in Robotics; Proceedings of ROBOTIK 2012; 7th German Conference on, pp. 1-6, VDE, 2012.
R. Letz, M. G. Cherniack, F. Gerr, D. Hershman, and P. Pace, "A cross sectional epidemiological survey of shipyard workers exposed to handarm vibration.," British journal of industrial medicine, vol. 49, No. 1, pp. 53-62, 1992.
M. Bovenzi, A. Fiorito, and C. Volpe, "Bone and joint disorders in the upper extremities of chipping and grinding operators," International archives of occupational and environmental health, vol. 59, No. 2, pp. 189-198, 1987.
G. Byrne and G. ODonnell, "An integrated force sensor solution for process monitoring of drilling operations," CIRP Annals Manufacturing Technology, vol. 56, No. 1, pp. 89-92, 2007.
M.B. Jun, O. B. Ozdoganlar, R. E. DeVor, S. G. Kapoor, A. Kirchheim, and G. Schaffner, "Evaluation of a spindle-based force sensor for monitoring and fault diagnosis of machining operations," International Journal of Machine Tools and Manufacture, vol. 42, No. 6, pp. 741-751, 2002.
H. Ohzeki, A. Mashine, H. Aoyama, and I. Inasaki, "Development of a magnetostrictive torque sensor for milling process monitoring," Journal of manufacturing science and engineering, vol. 121, No. 4, pp. 615-622, 1999.
A. A. Sarhan, A. Matsubara, S. Ibaraki, and Y. Kakino, "Monitoring of cutting force using spindle displacement sensor," in Proc. of the 2004 Japan-USA Symposium on Flexible Automation, Denver, 2004.
A. A. D. Sarhan, A. Matsubara, M. Sugihara, H. Saraie, S. Ibaraki, and Y. Kakino, "Monitoring method of cutting force by using additional spindle sensors," JSME International Journal Series C, vol. 49, No. 2, pp. 307-315, 2006.
Y. Altintas, "Prediction of cutting forces and tool breakage in milling from feed drive current measurements," Journal of Engineering for Industry, vol. 114, No. 4, pp. 386-392, 1992.
J. Lee, D. Choi, J. Kim, and C. Chu, "Real-time tool breakage monitoring for NC milling process," CIRP Annals-Manufacturing Technology, vol. 44, No. 1, pp. 59-62, 1995.
C. Ng, K. Chan, W. Teo, I. Chen, et al. , "A method for capturing the tacit knowledge in the surface finishing skill by demonstration for programming a robot," in Robotics and Automation (ICRA), 2014 IEEE International Conference on, pp. 1374-1379, IEEE, 2014.
H.-y. Tam and H. Cheng, "An investigation of the effects of the tool path on the removal of material in polishing," Journal of Materials Processing Technology, vol. 210, No. 5, pp. 807-818, 2010.
G. P. Hoang, P. Tommasino, M. Azhar, K. Welihena Gamage, A. Hussain, and D. Campolo, "Characterization of impedance rendering with a cable-driven agonist-antagonist haptic device," in International Conference on Control, Automation, Robotics and Vision, IEEE, 2014 (in press).
M. Shimizu, Y. Endo, H. Onda, W. K. Yoon and T. Torii, "Improving task skill transfer method by acquiring impedance parameters from human demonstration", in Mechatronics and Automation (ICMA), 2013 IEEE International Conference on (pp. 1033-1038), IEEE, 2013.
Foreign Correspondence From a Related Counterpart Application, International Search Report and Written Opinion dated Nov. 10, 2016, International Application No. PCT/SG2016/050426 filed on Sep. 1, 2016.

* cited by examiner

INSTRUMENTED TOOLS FOR MONITORING INTERACTION DYNAMICS DURING CONTACT TASK

CROSS REFERENCE TO RELATED APPLICATIONS

The present application is a filing under 35 U.S.C. 371 as the National Stage of International Application No. PCT/SG2016/050426, filed Sep. 1, 2016, entitled "INSTRUMENTED TOOLS FOR MONITORING INTERACTION DYNAMICS DURING CONTACT TASK," which claims priority to Singapore Application No. SG 10201506913S filed with the Intellectual Property Office of Singapore on Sep. 1, 2015, both of which are incorporated herein by reference in their entirety for all purposes

FIELD

This invention relates to an instrumented tool, and in particular to an instrumented tool for surface finishing of a manufactured work-piece.

BACKGROUND

Current manufacturing is dominated by high-mix, low-volume products. In addition, new manufacturing approaches such as 3D printing that are now possible for a large variety of materials, including metals) are revolutionizing the manufacturing process, giving designers unprecedented freedom in designing 3D forms for objects. As a result, surface finishing of manufactured work-pieces such as polishing, grinding and so on is becoming a bottleneck in the manufacturing chain. On the one hand, highly skilled workers might need to be employed to carry out finishing operations of complex surfaces (FIG. 1), making it a lengthy, expensive and operator-dependent process. On the other hand, even when robotic automation is possible, programming robots is still highly time consuming, especially in the case of high-mix, low-volume products, strongly reducing the benefits of automated finishing.

Ideally, robots are employed for various tasks such as material handling, welding, and spray painting that necessitate null or weak interaction between the manipulator and its environment. Conventional approach for operating such industrial robots is through position control. However, a majority of industrial tasks such as surface finishing involve strong physical interaction with the environment and cannot simply depend on position information for task execution. Hence, expert operators are typically required to perform such tasks in spite of high labour cost, health concerns, and quality-control issues.

Automating labour intensive surface finishing tasks require a robot to optimally adapt to unstable interactions with its dynamic workspace. These interactions generate contact forces that should be efficiently measured and controlled in order to achieve the desired end results. Skilled operators can sense these dynamic interactions with the work-piece in terms of 3D forces/torques, and implement appropriate motion and/or force control. This can be achieved through impedance level adjustment in accomplishing the desired task. Human operators learn these skills through years of experience and training, and easily adapt to uncertainties in the task. For a robot to handle a human-like adaptation of a finishing task typically requires a detailed programming and a repeated long-term testing with a high degree of detail for every single micro-motion/activity.

Thus, one of the first steps in transitioning from manual to a robotized surface finishing process is developing better understanding of a human operator's knowledge in terms of the interaction with the work-piece applied forces/torques, as well as the motion. However, it is challenging to identify the motor control mechanisms through which skilled operators dexterously manipulate tools and controls the interaction forces, as, at the highest stage of competence, skills are often unconsciously applied. This problem becomes even more significant when handheld tools are used, as the motion and forces involved are not constrained to any dimensions or axis of rotation.

SUMMARY

The present application discloses an instrumented tool for capturing both the force and the contact point during interaction of a polishing/grinding wheel with a work-piece. The concept of an instrumented finishing tool along with the equations to derive forces and contact points from the readings of 6-axis load cell is presented and experimentally verified by means of an external robot capable of exerting controlled forces. The disclosed instrumented tool is capable of accurately monitoring forces and points of contact arising between a spinning grinding/polishing wheel and work-piece.

Instrumenting finishing tools for the purposes of monitoring interaction dynamics on-line is desirable for various reasons:
- being able to monitor finishing operations performed by humans might allow capturing skills of experts to be later on transferred to robotic automation or assess performance of novice workers, for training purposes
- in a hybrid scenario, a human expert tele-operating a robot during finishing operations can buffer the human operator from hazards due to prolonged exposure to vibrating tools.

In one example, a grinding/polishing power tool may be configured to comprise the following:
- the flexible shaft provided between a spindle and spinning tool (e.g. wheel or disk) to minimize transfer of other torque besides only spinning torques from the spindle to the spinning tool
- a rigid assembly consisting of two brackets and a load cell and possible other sensors (e.g. for motion tracking) is placed mechanically in parallel to the flexible shaft for the purpose of sustaining the spinning tool In this way, any reaction force and torque (other than spinning torque) is transmitted through and sensed by the load cell instead of to the spinning tool.

In the disclosed approach:
- the load cell is located as close as possible to where interaction dynamics arise. In particular, the load cell does not have to sustain the weight of the spindle, so it can have a much reduced dynamic range and therefore higher resolution, suitable for finesse finishing tasks.
- the instrumented tool measures 3D forces and 3D torques and is able to estimate the contact point where the interaction takes place
- a calibration method is provided to overcome non-idealities of the flexible shaft assembly.

The disclosed instrumented tool is capable of capturing interaction 3D dynamics (in terms of contact points and interaction torques). In addition, accurate estimation of the application point of force is also made possible which, in general (in a manual operation) is derived using haptic information. The task dynamics can be captured while the operator engages in a finishing process utilizing the designed instrumented tool. The proposed instrumented tool is therefore capable of measuring forces/torques in three dimensions, as well as the application point, providing an initial step toward robotizing a manual complex surface finishing process.

According to a first aspect, there is provided an instrumented tool for surface finishing of a work-piece, the instrumented tool comprising: a tool configured to be spun and brought into contact with the work-piece while spinning; a spindle configured to provide a spinning torque to spin the tool; a flexible coupler provided between the spindle and the tool to transmit only spinning torque of the spindle to the tool; a rigid connection provided between the spindle and the tool in parallel to the flexible coupler; and a multi-axis force/torque/strain/pressure sensor attached to at least the rigid connection; wherein the rigid connection and the multi-axis force/torque sensor are decoupled from spinning of the spindle and the tool, and wherein the multi-axis force/torque sensor is configured to measure at least one of: contact force and torque between the tool and the work-piece.

The rigid connection may comprise a first rigid bracket attached to a casing of the spindle and a second rigid bracket attached to a holder of the tool.

The first rigid bracket may be L-shaped and the second rigid bracket may be L-shaped. The multi-axis force/torque/strain/pressure sensor may connect the first rigid bracket to the second rigid bracket.

The holder may be connected to the tool via a set of bearings that decouple the holder from spinning of the tool.

Alternatively, the rigid connection may comprise a cylindrical structure, a first end of the cylindrical structure connected via bearings to a shaft of the spindle and a second end of the cylindrical structure connected via bearings to a shaft of the tool.

The multi-axis force/torque/strain/pressure sensor may comprise a hollow sensor, the hollow sensor provided between and attached to both the spindle and the rigid connection, the shaft of the spindle passing through the hollow sensor.

The hollow sensor may comprise a hollow load cell.

The instrumented tool may further comprise means to sense spinning torque transmitted from the spindle to the tool. The means may comprise two encoders provided at each of two opposite ends of the flexible coupler to measure torsion transmitted through the flexible coupler. Alternatively, the means may comprise a current sensor configured to sense current and infer torque in a motor of the spindle.

The instrumented tool may further comprise an encoder provided at a motor of the spindle to measure at least one of: angular position and velocity of the tool.

According to second aspect, there is provided a method of determining a force $F_0$ and a torque $T_0$ between the work-piece and the tool of the instrumented tool of the first aspect, the method comprising the steps of:
(a) the multi-axis force/torque/strain/pressure sensor sensing a force $F_{AX}$ and a torque $T_{AX}$ applied by the tool to the work-piece; and
(b) solving for $F_0$ and $T_0$ using the following equation:

$$\begin{pmatrix} F_0 \\ T_0 \end{pmatrix} = \begin{bmatrix} {}^{TSK}R_{LC} & 0 \\ {}^{TSK}R_{LC}\hat{\Delta}^{LC} & {}^{TSK}R_{LC} \end{bmatrix} \begin{pmatrix} F_{AX} \\ T_{AX} \end{pmatrix}$$

where vector $\hat{\Delta}^{LC}$ and matrix ${}^{TSK}R_{LC}$ represent displacement of origin and rotation of axes of a coordinate system of the tool with respect to a coordinate system of the multi-axis force/torque/strain/pressure sensor respectively,
and where $$\hat{\Delta}^{LC} = \begin{bmatrix} \Delta x \\ 0 \\ \Delta z \end{bmatrix} \text{ and } {}^{TSK}R_{LC} = \begin{bmatrix} 0 & 0 & 1 \\ 1 & 0 & 0 \\ 0 & 1 & 0 \end{bmatrix}$$

$\Delta x$ being displacement of a centre of the tool from a centre of the multi-axis force/torque/strain/pressure sensor in a direction parallel to a spin axis of the tool, and
$\Delta z$ being displacement of the centre of the tool from the centre of the multi-axis force/torque/strain/pressure sensor in a direction orthogonal to a spin axis of the tool.

According to a third aspect, there is provided a method of estimating contact location of the work-piece on the tool of the instrumented tool of the first aspect, the method comprising the steps of:
(a) the multi-axis force/torque/strain/pressure sensor sensing a torque $T_0$ experienced by the tool arising from contact with the workpiece;
(b) the multi-axis force/torque/strain/pressure sensor sensing a force $F_0$ experienced by the tool arising from contact with the workpiece; and
(c) solving for $r_x$ and $r_y$ using the following equation:

$$\begin{bmatrix} r_x \\ r_y \end{bmatrix} = \begin{bmatrix} 0 & -F_{0z}^{-1} \\ F_{0z}^{-1} & 0 \end{bmatrix} \begin{bmatrix} T_{0x} \\ T_{0y} \end{bmatrix} = \begin{bmatrix} -T_{0y}/F_{0z} \\ +T_{0x}/F_{0z} \end{bmatrix}$$

wherein $r_x$ is a first tangential coordinate of the contact location and $r_y$ is a second tangential coordinate of the contact location, $r_x$ being orthogonal to $r_y$, $r_x$ and $r_y$ both being orthogonal to a spin axis of the tool; and
wherein $F_{0z}$ is a component of the force $F_0$ parallel to the spin axis of the tool, $T_{0y}$ is a component of the torque $T_0$ corresponding to a tangential orientation of $r_y$, and $T_{0x}$ is a component of the torque $T_0$ corresponding to a tangential orientation of $r_x$.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Figure 1:
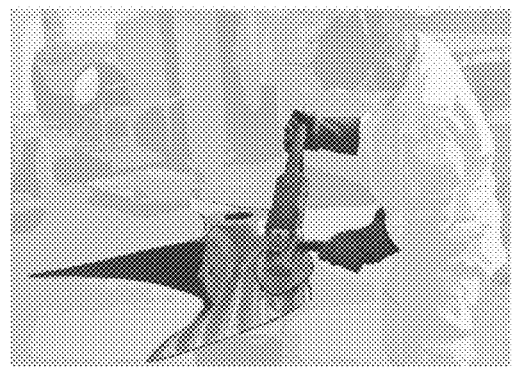
FIG. 1 is an illustration of manual polishing with a hand-held tool.

Exemplary embodiments of the instrumented tool 100 will be described below with reference to FIGS. 2(a) to 15. The same reference numerals are used throughout the figures to denote the same or similar parts among the various embodiments.

In general, the instrumented tool 100 comprises a spindle 10 configured to provide a torque to a tool 20 that is configured to be spun and brought into contact with a work-piece 200 in order to create a finish on the work-piece 200. The tool 20 may be of any known type, such as a grinding wheel or polishing disc and so on. The present approach for measuring applied forces as well as deriving the point of contact of the instrumented tool 100 with the work-piece 200 is achieved in principle by placing a multi-axis force/torque sensor or load cell 90 between the spindle 10 and the tool 20, mechanically and in parallel to the rotating shaft 30 of the spindle 10, as shown in FIGS. 2(a) to 3(b). In this way, the sensor or load cell 90 is therefore not rotating when the tool 20 rotates. A flexible coupler 80 such as a bellows coupling 80 is used to transmit only spinning motion from the spindle 10 to the tool 20, while any other reaction forces or torques are transmitted through and sensed by the multi-axis force/torque sensor 90 via a rigid connection 93 fixed to the spindle 10 and to the spinning tool 20, respectively. A set of bearings 40 decouple the spinning tool 20 from the rigid connection 93, allowing the former 20 to spin while the rigid connection 93 remains stationary. The force/torque sensor or load cell 90 is provided at the rigid connection 93. This configuration, in particular the bearings 40 between tool 20 and rigid connection 93, allow the load cell 90 to remain stationary while the tool 20 is spinning.

Figure 2A:
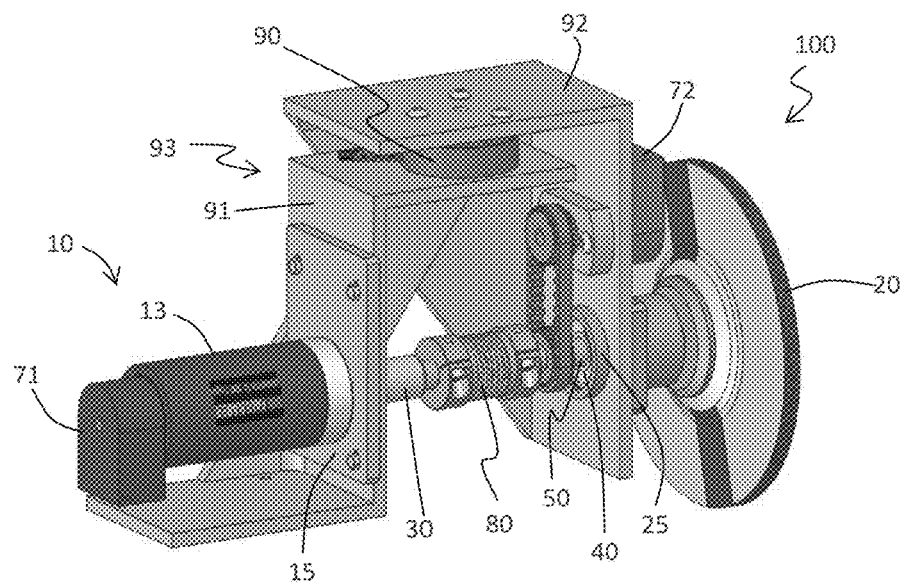
FIG. 2(a) is a perspective view of a first exemplary embodiment of the instrumented tool.
Figure 2B:
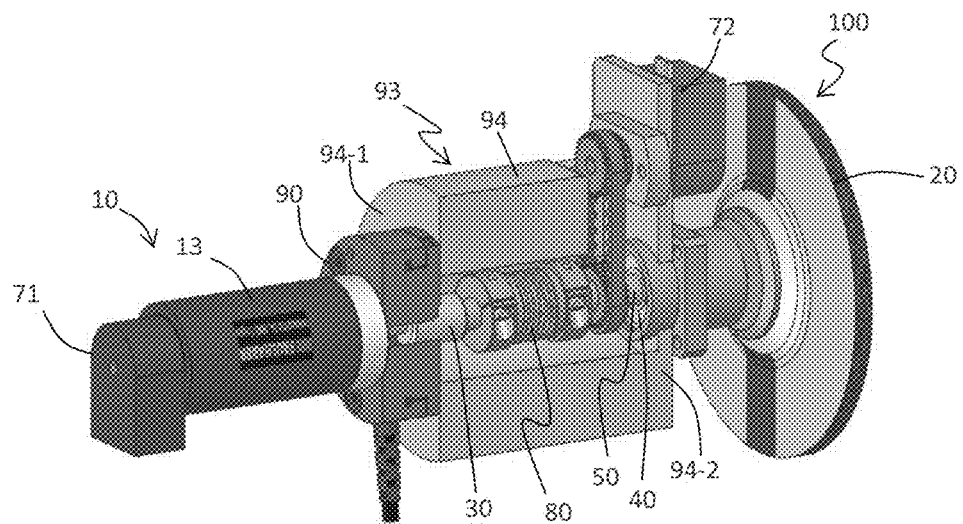
FIG. 2(b) is a perspective view of a second exemplary embodiment of the instrumented tool.
Figure 3A:
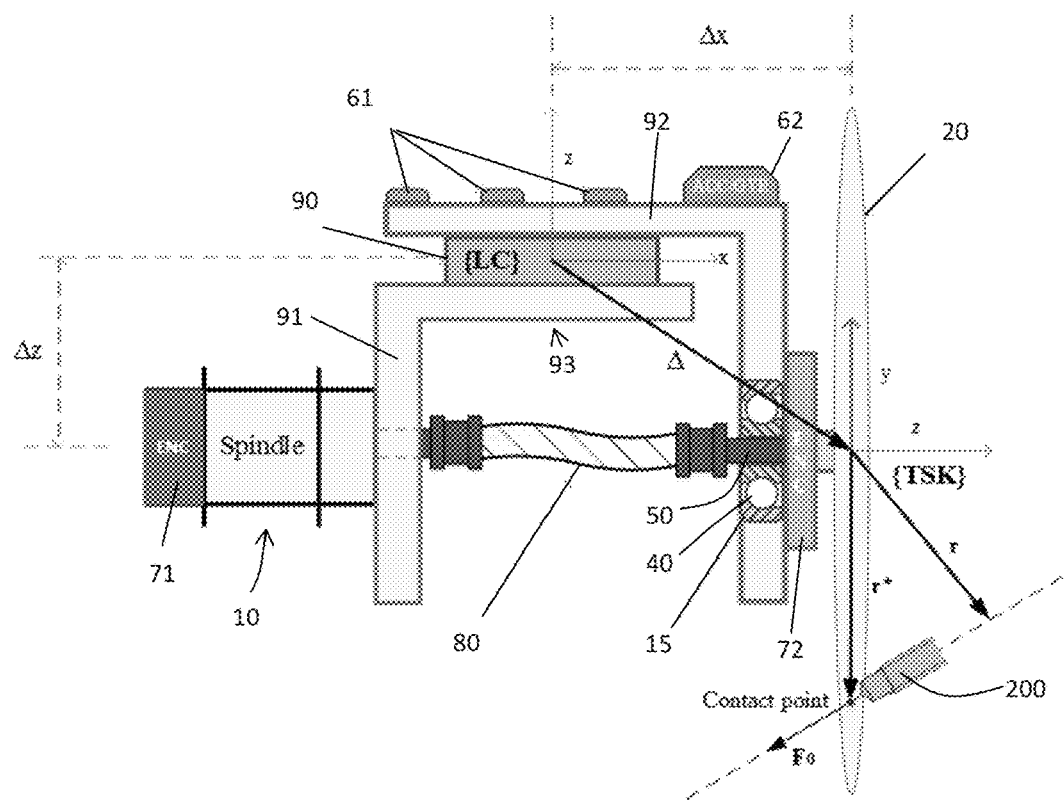
FIG. 3(a) is a schematic representation of the instrumented tool of FIG. 2(a).

As the de-coupling results in the load cell 90 not sensing any spinning torque, an alternative method is provided to sense output torque of the spindle 10. This may be achieved via dynamic estimation of the spindle torque (e.g. through current readings of a motor 13 of the spindle 10 using a current sensor (not shown) or by direct sensing of the torque transmitted through the flexible shaft or coupler 80. For direct sensing, two encoders 71, 72 may be deployed, one at each of the two ends 81, 82 of the flexible shaft or coupler 80 respectively. Alternatively, a combination of both dynamic estimation and direct sensing may be used (sensor fusion). The compliance of the flexible coupling or coupler 80 is such that all reaction forces/torques due to contact of the tool 20 with the work-piece 200 (e.g. between tool holder 25 and spindle casing 15 of Exemplary Embodiment 1 described below) are transmitted through the multi-axis force/torque sensor or load cell 90, as shown in FIG. 3(a). FIGS. 2(a) and 2(b) depict the tool 20 as a rigid wheel, although more general and other tools (e.g. compliant wheels) can be substituted.

Exemplary Embodiment 1

In a first exemplary embodiment of the instrumented tool 100 shown in FIGS. 2(a) and 3(a), the rigid connection 93 comprises a pair of rigid L-shaped brackets 91 and 92 fixed to a casing 15 of the spindle 10 and to a holder 25 of the spinning tool 20, respectively. A set of bearings 40 connect the tool shaft 50 to the tool holder 25 and decouple the spinning tool 20 from the tool holder 25, allowing the former 20 to spin while the holder 25 remains stationary. The two brackets 91, 92 are then connected to one another via the force/torque sensor or load cell 90 that is provided in the middle or between the two brackets 91, 92.

A Faulhaber 3863-024CR DC motor 13, equipped with an encoder 71 (500 pulses-per-revolution), is used as the spindle 10. An ATI mini 40 (range $F_{X,Y}$: ±80N, $F_Z$: ±240N, $T_{X,Y,Z}$: ±4 Nm) load cell 90 is selected for measuring interaction forces/torques between the tool 20 and the work-piece 200. The ATI load cell 90 is very rigid, in the order of $10^7$ N/m, but these values can be greatly reduced by parasitic compliance in the bracket-load cell attachments. The two brackets 91, 92 are made of AL6061 aluminium alloy for establishing the rigid connection 93 between the spindle casing 15 and the tool holder 25.

Bearings 40 are fixed inside the brackets 91, 92 respectively for connecting the brackets 91, 92 to the spindle shaft 30 and to the shaft 50 of the spinning wheel 20 respectively. The spindle shaft 30 and the tool shaft 50 are connected via the flexible coupler 80. In this embodiment, the flexible coupler 80 comprises bellows coupling CPBSC 25-10-10 from MISUMI. An additional encoder 13 (HEDL 5400 #A12) is attached with the motor 13 to measure angular position/velocity of the tool 10. The two encoders 71, 72 can also sense the angular torsion of the flexible coupler 80, thus providing a direct measure of the transmitted torque.

Exemplary Embodiment 2

Figure 3B:
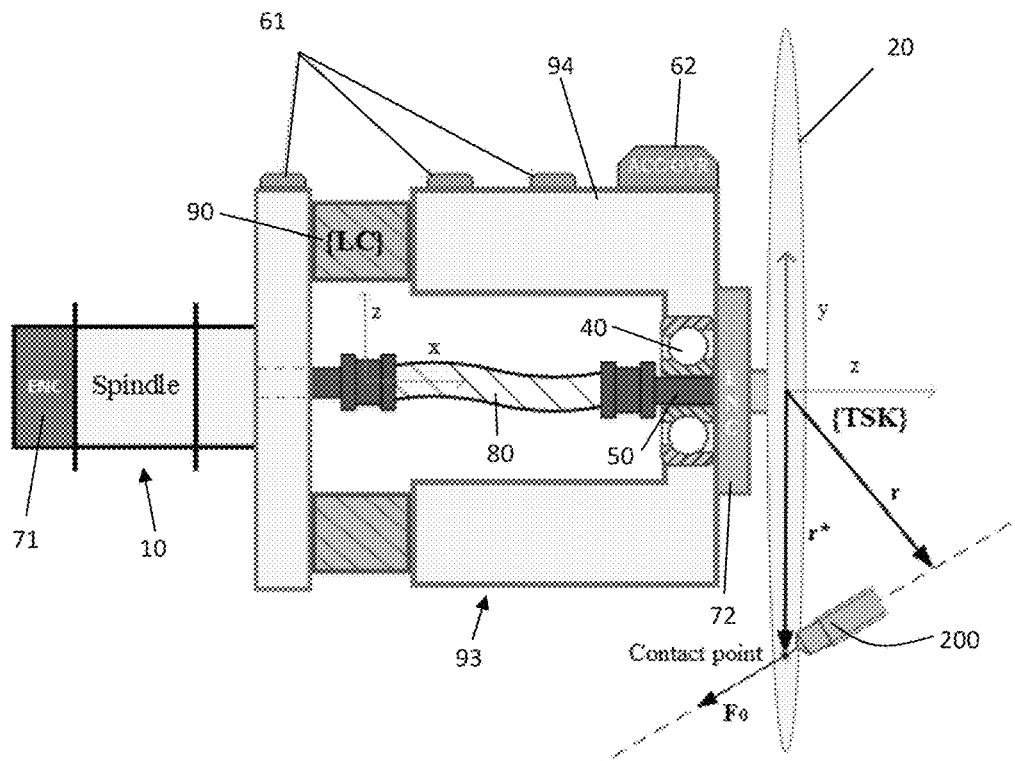
FIG. 3(b) is a schematic representation of the instrumented tool of FIG. 2(b).

In a second exemplary embodiment of the instrumented tool 100 as shown in FIGS. 2(b) and 3(b), a cylindrical structure 94 with a hollow load cell 90 is provided. The cylinder 94 may be made from AL6061 aluminium alloy, and is used for establishing the rigid connection 93 between the load cell 90 and the spinning wheel 20. A first end 94-1 of the cylindrical structure 94 is connected to the shaft 30 of the spindle 10 while a second end 94-2 of the cylindrical structure is connected to the shaft 50 of the tool 20 via bearings 40.

The hollow load cell 90 (e.g. Sunrise 35XX series—6-axis force/torque sensor) is attached to the spindle 10 and the first-end 94-1 of the cylinder 94 for measuring interaction force/torque between the tool 20 and the work-piece 200. The shaft 30 of the spindle 10 passes through the hollow load cell 90. Bearings 40 (which may be the same as those used in Exemplary Embodiment 1 described above) are provided inside the cylinder 94 for connecting the first end 94-1 of the cylinder 94 to the spindle shaft 30 and the second end 94-2 of the cylinder 94 to the spinning shaft 50 of the tool 20 respectively. The main advantage of this embodiment is that the cylindrical structure 94 has a symmetric shaft or rotational symmetry about its longitudinal axis, hence, it is easier for measurement and more convenient for an operator doing the tooling as well.

Estimation of Interaction Forces and Contact Point with Work-Piece

Without loss of generality, the Exemplary Embodiment 1 as shown in FIGS. 2(a) and 3(a) is used for all estimations and equations below. We make the assumption that the spinning tool 20 in the form of a rigid disk 20 interacts with the work-piece 200 at a very localized area, so that it can be described as a total force $F_0=[F_0x\ F_0y\ F_0z]$ acting at some point r*, with respect to the centre (z axis) of the spinning tool 20, as indicated in FIGS. 3(a) and 3(b). Optional optical markers 61 and inertial/accelerometer 62 shown in FIGS. 3(a) and 3(b) are for kinematic data monitoring.

With respect to a coordinate system {TΣK} located at the centre of the spinning tool 20, a wrench (i.e. a combination of force and torque components) is generated which can be written as:

$$W = \begin{bmatrix} F_0 \\ T_0 \end{bmatrix} = \begin{bmatrix} F_0 \\ r \times F_0 \end{bmatrix} \quad (1)$$

where $T_0=[T_0x\ T_0y\ T_0z]=r \times F_0$ is the torque with respect to the centre of the tool 20 due to force $F_0$ applied off-centre (r*). The same physical wrench can be expressed in different coordinate systems, for example with respect to the task (tool) space $W^{TSK}$ and the load cell space $W^{LC}$. The two representations can be related to one another using the following transformation (see FIG. 3(a)):

$$W^{TSK} = \begin{bmatrix} {}^{TSK}R_{LC} & 0 \\ {}^{TSK}R_{LC}\hat{\Delta}^{LC} & {}^{TSK}R_{LC} \end{bmatrix} W^{LC} \quad (2)$$

where $$W^{TSK} = \begin{pmatrix} F_0 \\ T_0 \end{pmatrix}$$

and the vector $\hat{\Delta}^{LC}$ and the matrix ${}^{TSK}R_{LC}$ represent the displacement of the origin and the rotation of the axes of the {TΣK} coordinate systems with respect to the {ΛX} coordinate system respectively (see FIG. 3(a)), and where $$\hat{\Delta}^{LC} = \begin{bmatrix} \Delta x \\ 0 \\ \Delta z \end{bmatrix} \text{ and } {}^{TSK}R_{LC} = \begin{bmatrix} 0 & 0 & 1 \\ 1 & 0 & 0 \\ 0 & 1 & 0 \end{bmatrix} \quad (3)$$

It should be noted that the wrench $W^{LC}$ contains exactly the same force $F_{\Lambda X}$ and torque $T_{\Lambda X}$ components as measured by the ATI load cell, i.e., $$W^{LC} = \begin{pmatrix} F_{\Lambda X} \\ T_{\Lambda X} \end{pmatrix}$$

Combining eq. (1) and (2), $T_0$ and $F_0$ can be obtained from the load cell readings of torque $T_{\Lambda X}$ and force $F_{\Lambda X}$.

In order to determine the application point r, solve $T_0=r \times F_0$. However, this equation has multiple solutions. In particular, if r* is a solution, also $r^*+\lambda F_0$ is a solution, where λ can have any scalar value.

As we are considering rigid tools 20 (e.g. grinding wheels), we shall impose that the contact point stays on the wheel, i.e. $r_z=0$. Therefore, by imposing $r^{T\Sigma K}=[r_x\ r_y\ 0]^T$ and combining eq. (1)-(3), we get:

$$\begin{bmatrix} r_x \\ r_y \end{bmatrix} = \begin{bmatrix} 0 & -F_{0z}^{-1} \\ F_{0z}^{-1} & 0 \end{bmatrix} \begin{bmatrix} T_{0x} \\ T_{0y} \end{bmatrix} = \begin{bmatrix} -T_{0y}/F_{0z} \\ +T_{0x}/F_{0z} \end{bmatrix} \quad (4)$$

From the above equation (4) we can estimate the contact point on a rigid disk using component of force applied normal to the surface of the disk 20 ($F_{0z}$) and corresponding torques ($T_{0x}$ and $T_{0y}$) produced. $F_0$ and $T_0$ are vectors where $F_{0x}$, $F_{0y}$, $F_{0z}$ and $T_{0x}$, $T_{0y}$ and $T_{0z}$ are the components of the vectors.

Effect of Bellows Coupler

Previous equations as given above are based on the assumption that the bellows coupler 80 will only transmit spinning torques ($T_{0z}$) and will be ideally transparent in terms of reaction force ($F_{0x}$, $F_{0y}$, $F_{0z}$) and remaining reaction torque ($T_{0x}$, $T_{0y}$) components (with respect to the {TΣK} space). In practice, the bellows coupler 80 will have non-negligible stiffness which might affect reaction forces and torques as well.

Figure 4:
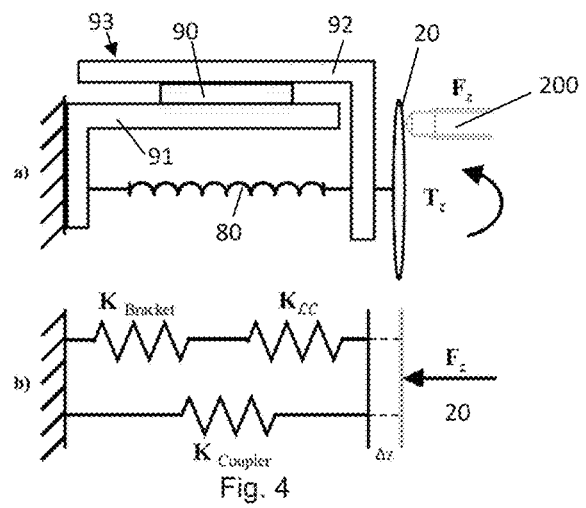
FIG. 4 is a schematic model accounting for coupler stiffness ($K_{Coupler}$) and parasitic stiffness of a bracket assembly ($K_{Bracket}$) of the instrumented tool of FIG. 2(a) on force readings.

For example, considering a pure axial loading, a total axial force $F_{0z}$ would be counteracted (and, at the same time, transmitted to the human operator) partly by the load cell and partly by the coupler, i.e.:

$$F_z = F_{LC} + F_{Coupler} \quad (5)$$

which will be in proportion to the stiffness of the two components, i.e.:

$$\frac{F_{LC}}{K_{LC}^*} = \frac{F_{Coupler}}{K_{Coupler}} \quad (6)$$

where $K_{Coupler}$ is the axial stiffness of the coupler and $K^*_{\Lambda X}$ is the effective stiffness of the load cell-brackets assembly 93 in the axial direction (see FIG. 4). The consequence is that the sensed force (FLC) is lower than expected $F_z$ by the following factor:

$$F_{LC} = \alpha_f F_z,$$

$$\alpha_f = \frac{K_{LC}^*}{K_{LC}^* + K_{Coupler}} \quad (7)$$

where $\alpha_f$ is the attenuation factor of sensed axial forces.

Experimental Validation

The section presents experimental tests of the proposed instrumented tool 100 to determine the accuracy of measured contact force/torque as well as of estimated contact point during interaction with a work-piece 200 when the tool 20 is fixed.

A. Measuring Contact Force/Torque

Figure 5:
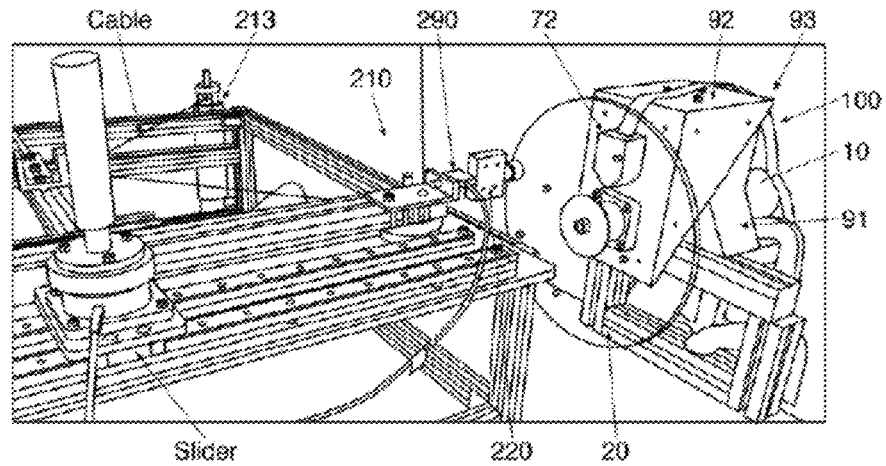
FIG. 5 is a photograph of an experimental set-up for experimental validation of the instrumented tool of FIG. 2(b).

The set-up used in the experiment is shown in the FIG. 5. In this set-up, a rigid wheel 20 was used which gives a special solution for estimating the contact point $r_z=0$ presented in equation (11). If the wheel 20 is not rigid, the equation will no longer be valid and the equation T=r×F will give multiple solutions for the coordinates of contact point r all lying in the line of the application force (see FIGS. 3(*a*) and 3(*b*)).

For application of controlled force on the tool 100 as a standard, we used a one degree of freedom cable driven robot 210 with a pointer device 220 attached at its end effector and actuated by current-controlled DC motors [15] 213. The robot 210 and the instrumented tool 100 were manually set one in front of the other and grounded to a table. The robot 210 is capable of generating forces up to 7N and, for a detailed description, reader is referred to [15]. The robotic set-up 210 was programmed to apply forces on the disk 20 with increasing steps of 0.3N. The force on the wheel 20 is measured by a 6-axis ATI load cell 90 embedded in the instrumented tool 100 (see FIG. 4) and by a 1-axis load cell 290 (Futek) mounted on the pointer 220 of the robotic setup 210 (see FIG. 7) with a sampling rate of 1 kHz. Accuracy of the contact forces as measured by the instrumented tool 100 (with and without the effect of the bellows coupler 80) is determined by comparing data captured by the two load cells (load cell of the tool 100 and load cell 290 of the robot 210) for different levels of applied force.

Figure 6:
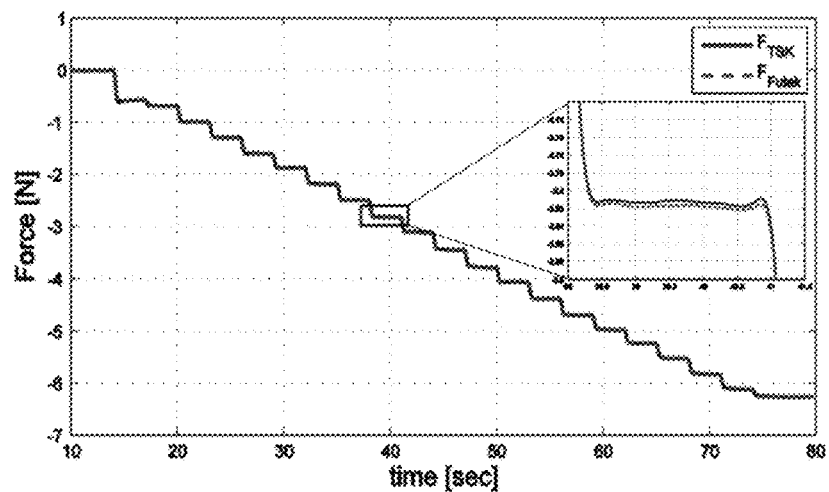
FIG. 6 is a graph comparing force measured by the instrumented tool and force applied by a robotic set-up of the experimental set-up of FIG. 5.
Figure 7:
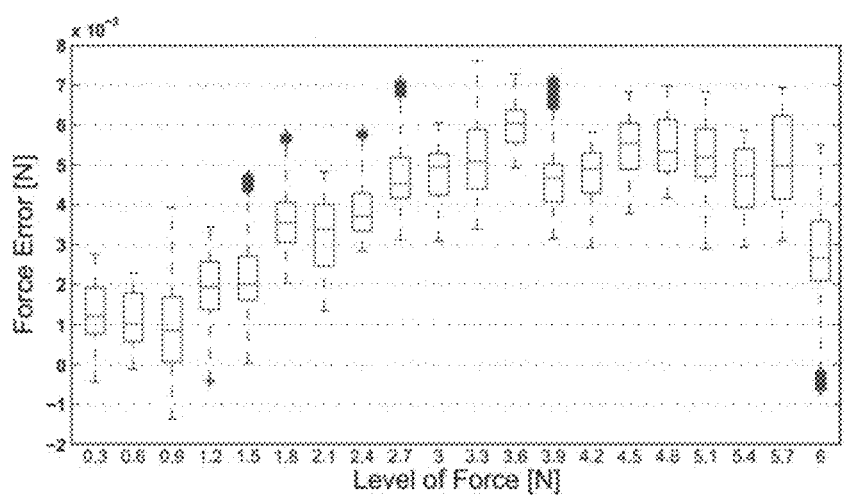
FIG. 7 is a force estimation error plot between force ($F_{T\Sigma K}$) measured by the instrumented tool and force ($F_{Futek}$) applied by a robotic set-up of the experimental set-up of FIG. 5 for a range of applied forces.

1) Force/Torque Estimation without Bellows Coupler (Static Wheel 20):

This experiment is meant to test the accuracy of transformations equations (1)-(3) without the effect of the bellows coupler (hidden from view) (spindle 10 and the tool 20 are only connected via the brackets 91, 92 of the rigid connection 93). As a consequence, the rigid wheel 20 is not spinning (as the spinning torque is only transmitted through the coupler 80). The robot pointer 220 was set to make contact with the rigid wheel 20 at a radial distance of 50 mm from the centre of the wheel 20 and was programmed to apply step increasing force. FIG. 6 shows the applied stepped force $F_{Futek}$ in z-direction applied by the pointer device 220 and force measured $F_{TSK}$ by the instrumented tool 100 after transformation from ATI load cell space to the task space. The accuracy of estimated force in z-direction is shown in the boxplot of FIG. 7. It shows that the grinder tool 100 in static case with rigid disk 20 can sense the applied contact force/torque reliably for different levels of forces/torques applied and the approximate range of error is within the range of $10^{-3}$ N.

2) Force/Torque Estimation with Bellows Coupler (the Wheel 20 Rotates at 2000 Rpm)

The spindle 10 of the instrumented tool 100 is controlled to rotate at 2000 rpm in order to compare the accuracy of force measured on the instrumented tool's ATI load cell (hidden from view) and applied by the pointer device's 220 load cell 290. The robot pointer 220 was set at the same position as the previous experiment (step size 0.5N).

Figure 8:
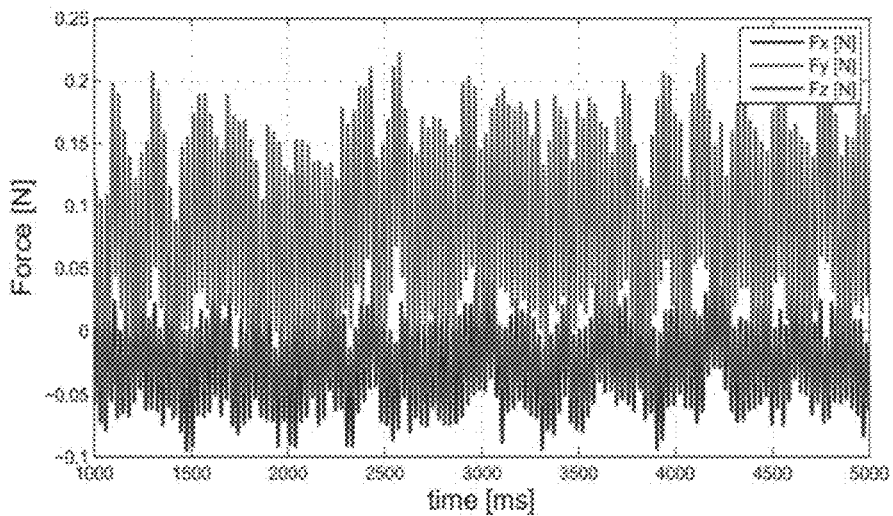
FIG. 8 is a graph of effect of the flexible coupler at spindle speed of 2000 rpm on force measured by the instrumented tool.

Practically, it is difficult to properly align the coupler 80 to be in line with the shaft of spindle 10. This misalignment affects the measured forces/torques by the load cell 90 as a sinusoidal function of angular position θ (from 0-2π rad) as shown in FIG. 8. To measure the bellows coupler's effect in x, y and z-direction, we control the spindle's 10 speed at 2000 rpm and forces are recorded at task space. Then, $F_0$ will be presented in terms of angular position θ of the spindle 10. The three curves in FIG. 8 show average component values of $F_0$ of the coupler's effect to the task space. At high speed, the bellows coupler's effect is very low as shown in FIG. 8. In order to remove the coupler's effect, we subtract the forces which are recorded during operation with the average forces shown in FIG. 8 in term of e. Notably, the coupler's stiffness is lowest in z-direction, so $F_z^{TSK}$ is approximately equal to zero.

Figure 9:
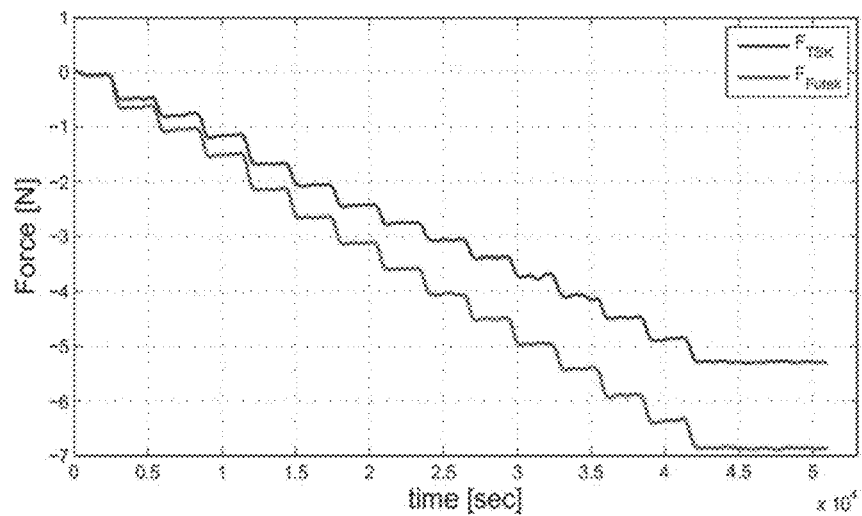
FIG. 9 is a graph of comparison in the z-direction between force ($F_{T\Sigma K}$) measured by the instrumented tool and force ($F_{Futek}$) applied by a robotic set-up of the experimental set-up of FIG. 5 at spindle speed of 2000 rpm.

FIG. 9 shows the force measured on instrumented tool 100 ($F_{TSK}$) and the application force of robot device 210 $F_{Futek}$ at spindle speed of 2000 rpm. The different force measured can be explained by using equation (7). Here, $\alpha_f=0.77$ is the constant value and relates to instrumented tool 100 by the following equation:

$$\alpha_f = \frac{F_z^{TSK}}{F_{Futek}} = 0.77 \tag{8}$$

Figure 10:
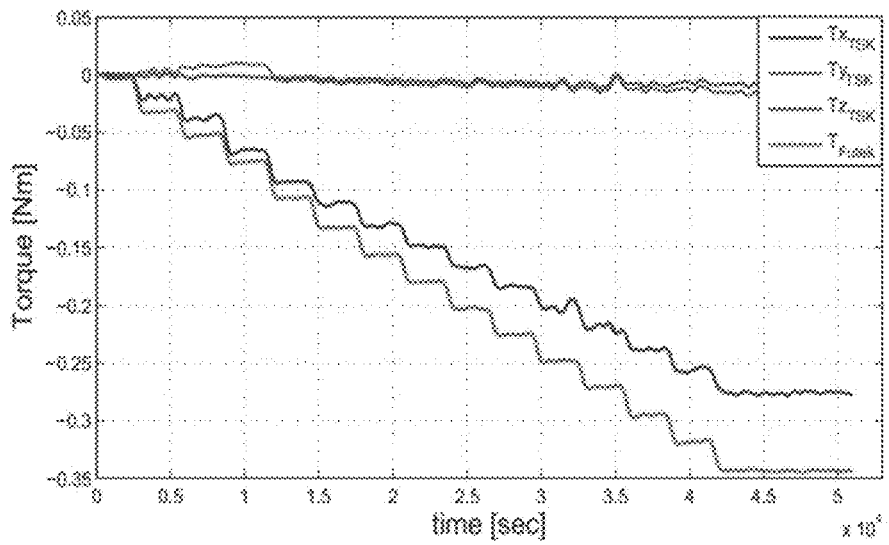
FIG. 10 is a graph of comparison in the z-direction between torque ($T_{T\Sigma K}$) measured by the instrumented tool and torque ($T_{Futek}$) applied by a robotic set-up of the experimental set-up of FIG. 5 at spindle speed of 2000 rpm.
Figure 11:
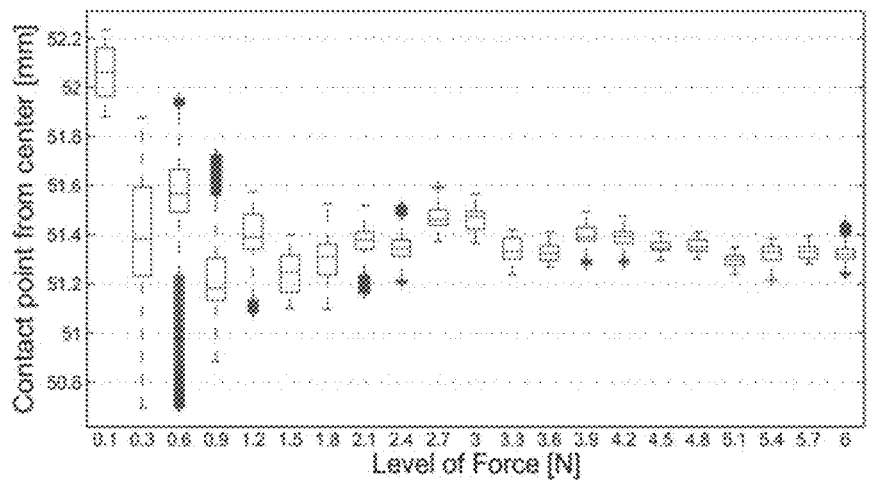
FIG. 11 is a contact point estimation error plot for a range of applied forces without using the flexible coupler.

FIG. 10 shows the comparison between the torque captured on the ATI load cell 90 and the estimated torque $T_x$, calculated by using equation (4).

In this experiment, the pointer device 220 was set at a radial distance of 50 mm on the y-axis of the wheel 20, hence, the only significant torque will be $T_x$. The ideal torque caused by $F_{Futek}$ will equal to:

$$T_{Futek}=r \times F_{Futek} \tag{9}$$

Based on this, let αt be the ratio between the ideal torque $T_{Futek}$ and the torque estimated on task space $T_x^{TSK}$. So using equation (8) and based on the data which is shown in FIG. 10, we have:

$$\alpha_t = \frac{T_x^{TSK}}{T_{Futek}} = 0.8 \tag{10}$$

B. Estimation of Contact Point

The same data was used from the two previous experiments using the set-up shown in FIG. 5 where the pointer 220 of the robot 210 was set approximately at a radial distance of 50 mm from the wheel 20 and was programmed to apply a step wise increasing force. In the experiment without coupler's effect, the equation (4) gave the contact point with the accuracy shown in FIG. 11.

Figure 12:
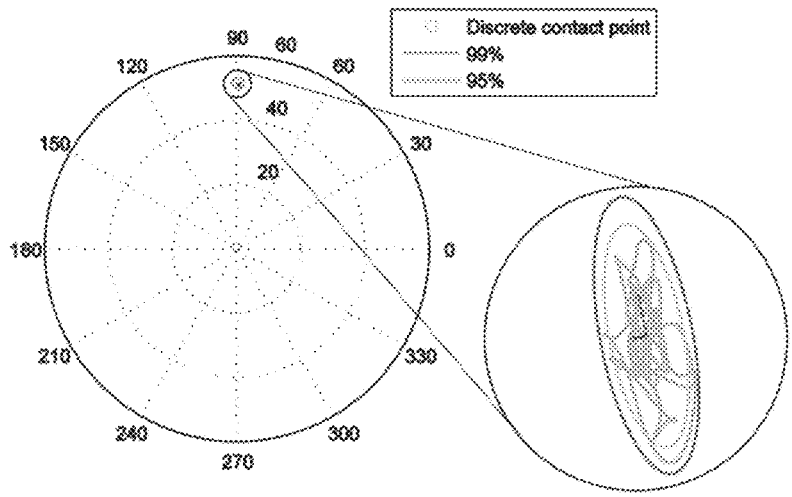
FIG. 12 shows accuracy of measured discrete point of application of force.

FIG. 12 shows accuracy of measured discrete point of application of force in polar coordinate without the bellows coupler 80. The confidence ellipse defines the region that contains 95% of all samples that can be drawn from the underlying Gaussian distribution.

Under the bellows coupler's effect, from equations (1), (4), (8), (9) and (10), we get the application point:

$$\begin{bmatrix} r_x \\ r_y \end{bmatrix} = \frac{\alpha_t}{\alpha_f} \begin{bmatrix} -T_{0y}/F_{0z} \\ +T_{0x}/F_{0z} \end{bmatrix} \tag{11}$$

Figure 13:
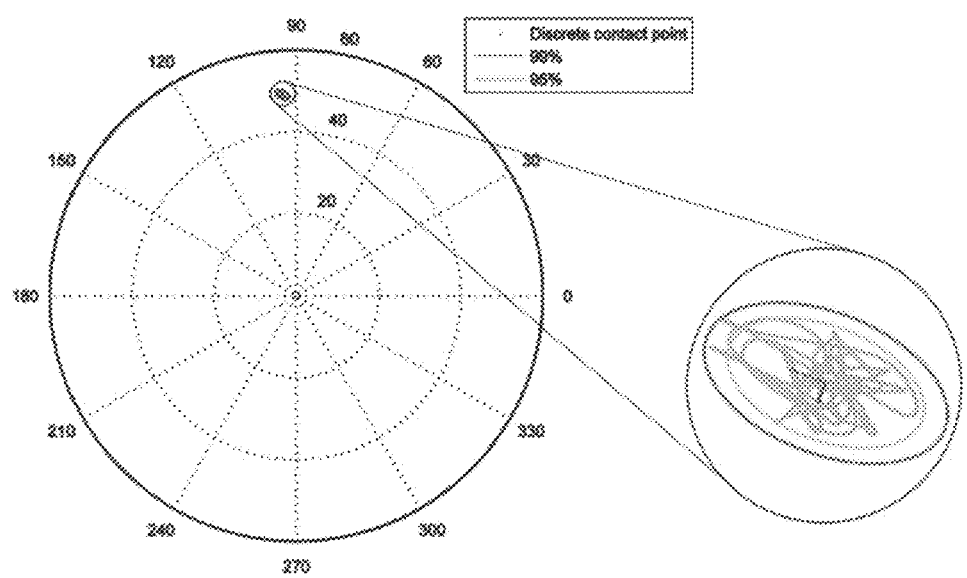
FIG. 13 shows additional accuracy of measured discrete point of application of force.
Figure 14:
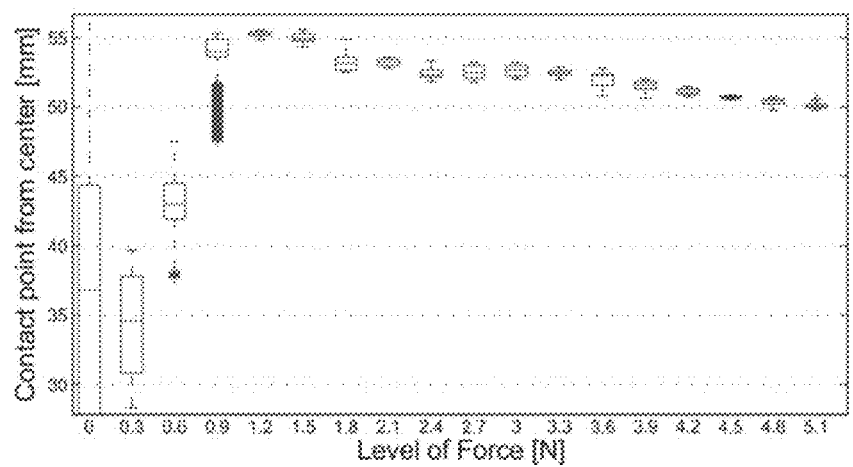
FIG. 14 is a contact point estimation error plot for a range of applied forces using the flexible coupler.
Figure 15:
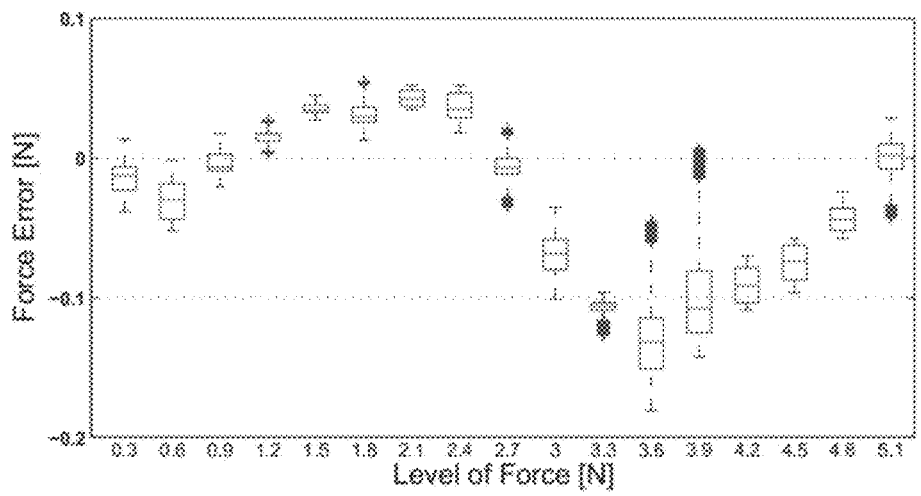
FIG. 15 is a force estimation error plot between force ($F_{T\Sigma K}$) measured by the instrumented tool and force ($F_{Futek}$) applied by a robotic set-up of the experimental set-up of FIG. 5 for a range of applied forces at spindle speed of 2000 rpm after calibration.

The accuracy of contact point estimated is shown in FIGS. 13 and 14. The application force which is used to estimate the contact point is greater than 3 N. Discrete captured data is filtered by using low-pass filter (second order Butterworth filter) with a cut-off frequency of 1 Hz to remove noise. The estimated application points are obtained from equation (11). Experiment result is shown in FIG. 13, which shows accuracy of measured discrete point of application of force in polar coordinate when the wheel rotates at 2000 rpm, and where the accuracy of contact point is presented by an error ellipse. The confidence ellipse defines the region that contains 95% of all samples that can be drawn from the underlying Gaussian distribution. The accuracy of force measured is shown in the boxplot of FIG. 15 which is a force estimation error plot between force measured by the instrumented tool 100 and force applied by the robotic setup 210 for a range of applied forces at 2000 rpm after calibration: error=$F_{Futek}-(F_{T\Sigma K}/\alpha_f)$. These experimental results show high accuracy in force detection, with force errors in the range of ±0.1 N. FIG. 15 also shows that at low levels of applied force, the contact point approximation has a higher degree of variation. However, as we increase the contact force the accuracy of estimation of contact point increases and variability decreases.

The above described instrumented tool 100 presents a novel approach for instrumenting hand-held tools for polishing/grinding used in monitoring the performance of skilled human operators which can be, in future work, translated into planning strategies for robot programming and control. More specifically, the instrumented tool 100 is designed to monitor interaction forces with the work-piece 200 and point of contact, where these interaction forces arise. The key element is a flexible coupler 80 which, ideally, only transmits rotation torque to spin the polishing/grinding wheel or other spinning tool 20 while all the remaining torque and force components are transmitted through a parallel stationary structure 94 and sensed by a 6-axis load cell 90. Sensing torques, in addition to forces, allows estimating the point of contact, as per equation (4). This concept was experimentally tested via an external 1dof robot 210 capable of exerting controlled forces at different intensities. The device 100 was tested in static condition, i.e., without a coupler and therefore with a static polishing wheel 20; and in dynamic conditions, where the coupler 80 induced rotations as high as 2000 rpm. Experimental results in conditions show high accuracy in force detection, with force errors in the range of ±0.1 N (FIG. 15).

In the dynamic case, i.e. when a coupler 80 was inducing a 2000 rpm rotation speed of the polishing wheel 20, a similar experiment was conducted. The non-ideal presence of a coupler 80 was evident in the diminished sensitivity in the transmitted force, eq. (8), and torque, eq. (10). Nevertheless, once these values were accounted for, forces and contact points could be reliably detected, as shown in FIGS. 13 and 14. These results indicate high potential of the designed set-up shown in FIG. 5 to accurately capture applied force and estimate contact position in the static case.

Whilst there has been described in the foregoing description exemplary embodiments of the present invention, it will be understood by those skilled in the technology concerned that many variations and combinations in details of design, construction and/or operation may be made without departing from the present invention. For example, while a multi-axis force/torque sensor is described above, the sensor may be a multi-axis force/torque/strain/pressure sensor. While the rigid connection may comprise two rigid L-shaped brackets or a cylindrical structure as described above, other embodiments of the rigid connection may be envisaged, such as a U-shaped rigid frame having a first end connected to the spindle shaft via bearings and a second end connected to the tool shaft via bearings, or two rigid brackets having other shapes than L-shaped. In an alternative embodiment using two rigid brackets, the two brackets may be fixedly connected to each other while the multi-axis force/torque sensor may be a hollow load cell as that described in Exemplary Embodiment 2 where the load cell is provided between the spindle and the first rigid bracket, the spindle shaft passing through the hollow load cell.

REFERENCES

[1] J. N. Pires, A. Loureiro, T. Godinho, P. Ferreira, B. Fernando, and J. Morgado, "Welding robots," *Robotics & Automation Magazine, IEEE*, vol. 10, no. 2, pp. 45-55, 2003.

[2] T. Sugar and V. Kumar, "Control and coordination of multiple mobile robots in manipulation and material handling tasks," in *Experimental Robotics VI*, pp. 15-24, Springer, 2000.

[3] A. Gasparetto, R. Vidoni, D. Pillan, and E. Saccavini, "Automatic path and trajectory planning for robotic spray painting," in *Robotics; Proceedings of ROBOTIK 2012; 7th German Conference on*, pp. 1-6, VDE, 2012.

[4] R. Letz, M. G. Cherniack, F. Gerr, D. Hershman, and P. Pace, "A cross sectional epidemiological survey of shipyard workers exposed to handarm vibration," *British journal of industrial medicine*, vol. 49, no. 1, pp. 53-62, 1992.

[5] M. Bovenzi, A. Fiorito, and C. Volpe, "Bone and joint disorders in the upper extremities of chipping and grinding operators," *International archives of occupational and environmental health*, vol. 59, no. 2, pp. 189-198, 1987.

[6] G. Byrne and G. ODonnell, "An integrated force sensor solution for process monitoring of drilling operations," *CIRP Annals Manufacturing Technology*, vol. 56, no. 1, pp. 89-92, 2007.

[7] M. B. Jun, O. B. Ozdoganlar, R. E. DeVor, S. G. Kapoor, A. Kirchheim, and G. Schaffner, "Evaluation of a spindle-based force sensor for monitoring and fault diagnosis of machining operations," *International Journal of Machine Tools and Manufacture*, vol. 42, no. 6, pp. 741-751, 2002.

[8] H. Ohzeki, A. Mashine, H. Aoyama, and I. Inasaki, "Development of a magnetostrictive torque sensor for milling process monitoring," *Journal of manufacturing science and engineering*, vol. 121, no. 4, pp. 615-622, 1999.

[9] A. A. Sarhan, A. Matsubara, S. Ibaraki, and Y. Kakino, "Monitoring of cutting force using spindle displacement sensor," in *Proc. of the 2004 Japan-USA Symposium on Flexible Automation*, Denver, 2004.

[10] A. A. D. Sarhan, A. Matsubara, M. Sugihara, H. Saraie, S. Ibaraki, and Y. Kakino, "Monitoring method of cutting force by using additional spindle sensors," *JSME International Journal Series C*, vol. 49, no. 2, pp. 307-315, 2006.

[11] Y. Altintas, "Prediction of cutting forces and tool breakage in milling from feed drive current measurements," *Journal of Engineering for Industry*, vol. 114, no. 4, pp. 386-392, 1992.

[12] J. Lee, D. Choi, J. Kim, and C. Chu, "Real-time tool breakage monitoring for nc milling process," *CIRP Annals-Manufacturing Technology*, vol. 44, no. 1, pp. 59-62, 1995.

[13] C. Ng, K. Chan, W. Teo, I. Chen, et al., "A method for capturing the tacit knowledge in the surface finishing skill by demonstration for programming a robot," in *Robotics* and *Automation (ICRA), 2014 IEEE International Conference on*, pp. 1374-1379, IEEE, 2014.

[14] H.-y. Tam and H. Cheng, "An investigation of the effects of the tool path on the removal of material in polishing," *Journal of Materials Processing Technology*, vol. 210, no. 5, pp. 807-818, 2010.

[15] G. P. Hoang, P. Tommasino, M. Azhar, K. Welihena Gamage, A. Hussain, and D. Campolo, "Characterization of impedance rendering with a cable-driven agonist-antagonist haptic device," in *International Conference on Control, Automation, Robotics and Vision*, IEEE, 2014 (in press).

The invention claimed is:

1. An instrumented tool for surface finishing of a work-piece, the instrumented tool comprising:
  a tool configured to be spun and brought into contact with the work-piece while spinning;
  a spindle configured to provide a spinning torque to spin the tool;
  a flexible coupler provided between the spindle and the tool to transmit only spinning torque of the spindle to the tool;
  a rigid connection provided between the spindle and the tool in parallel to the flexible coupler; and
  a multi-axis force/torque/strain/pressure sensor attached to at least the rigid connection;
  wherein the rigid connection and the multi-axis force/torque/strain/pressure sensor are decoupled from spinning of the spindle and the tool, and
  wherein the multi-axis force/torque/strain/pressure sensor is configured to measure at least one of: contact force and torque between the tool and the work-piece.

2. The instrumented tool of claim 1, wherein the rigid connection comprises a first rigid bracket attached to a casing of the spindle and a second rigid bracket attached to a holder of the tool.

3. The instrumented tool of claim 2, wherein the first rigid bracket is L-shaped and the second rigid bracket is L-shaped.

4. The instrumented tool of claim 2, wherein the multi-axis force/torque/strain/pressure sensor connects the first rigid bracket to the second rigid bracket.

5. The instrumented tool of claim 2, wherein the holder is connected to the tool via a set of bearings that decouple the holder from spinning of the tool.

6. The instrumented tool of claim 1, wherein the rigid connection comprises a cylindrical structure, a first end of the cylindrical structure connected via bearings to a shaft of the spindle and a second end of the cylindrical structure connected via bearings to a shaft of the tool.

7. The instrumented tool of claim 1, wherein the multi-axis force/torque/strain/pressure sensor comprises a hollow sensor, the hollow sensor provided between and attached to both the spindle and the rigid connection, the shaft of the spindle passing through the hollow sensor.

8. The instrumented tool of claim 7, wherein the hollow sensor comprises a hollow load cell.

9. The instrumented tool of claim 1, further comprising a sensor configured to sense spinning torque transmitted from the spindle to the tool.

10. The instrumented tool of claim 9, wherein the sensor comprises two encoders provided at each of two opposite ends of the flexible coupler to measure torsion transmitted through the flexible coupler.

11. The instrumented tool of claim 1, further comprising an encoder provided at a motor of the spindle to measure at least one of: angular position and velocity of the tool.

12. A method of determining a force $F_0$ and a torque $T_0$ between the work-piece and the tool of the instrumented tool of claim 1, the method comprising the steps of:
  (a) the multi-axis force/torque/strain/pressure sensor sensing a force $F_{AX}$ and a torque $T_{AX}$ applied by the tool to the work-piece; and
  (b) solving for $F_0$ and $T_0$ using the following equation:

$$\begin{pmatrix} F_0 \\ T_0 \end{pmatrix} = \begin{bmatrix} {}^{TSK}R_{LC} & 0 \\ {}^{TSK}R_{LC}\hat{\Delta}^{LC} & {}^{TSK}R_{LC} \end{bmatrix} \begin{pmatrix} F_{AX} \\ T_{AX} \end{pmatrix}$$

where vector $\hat{\Delta}^{LC}$ and matrix ${}^{TSK}R^{LC}$ represent displacement of origin and rotation of axes of a coordinate system of the tool with respect to a coordinate system of the multi-axis force/torque/strain/pressure sensor respectively,
and where $$\hat{\Delta}^{LC} = \begin{bmatrix} \Delta x \\ 0 \\ \Delta z \end{bmatrix} \text{ and } {}^{TSK}R_{LC} = \begin{bmatrix} 0 & 0 & 1 \\ 1 & 0 & 0 \\ 0 & 1 & 0 \end{bmatrix}$$

$\Delta x$ being displacement of a centre of the tool from a centre of the multi-axis force/torque/strain/pressure sensor in a direction parallel to a spin axis of the tool, and
$\Delta z$ being displacement of the centre of the tool from the centre of the multi-axis force/torque/strain/pressure sensor in a direction orthogonal to a spin axis of the tool.

13. A method of estimating contact location of the work-piece on the tool of the instrumented tool of claim 1, the method comprising the steps of:
  (a) the multi-axis force/torque/strain/pressure sensor sensing a torque $T_0$ experienced by the tool arising from contact with the workpiece;
  (b) the multi-axis force/torque/strain/pressure sensor sensing a force $F_0$ experienced by the tool arising from contact with the workpiece; and
  (c) solving for $r_x$ and $r_y$ using the following equation:

$$\begin{bmatrix} r_x \\ r_y \end{bmatrix} = \begin{bmatrix} 0 & -F_{0z}^{-1} \\ F_{0z}^{-1} & 0 \end{bmatrix} \begin{bmatrix} T_{0x} \\ T_{0y} \end{bmatrix} = \begin{bmatrix} -T_{0y}/F_{0z} \\ +T_{0x}/F_{0z} \end{bmatrix}$$

wherein $r_x$ is a first tangential coordinate of the contact location and $r_y$ is a second tangential coordinate of the contact location, $r_x$ being orthogonal to $r_y$, $r_x$ and $r_y$ both being orthogonal to a spin axis of the tool; and
wherein $F_{0z}$ is a component of the force $F_0$ parallel to the spin axis of the tool, $T_{0y}$ is a component of the torque $T_0$ corresponding to a tangential orientation of $r_y$ and $T_{0x}$ is a component of the torque $T_0$ corresponding to a tangential orientation of $r_x$.

* * * * *